United States Patent
Halamik et al.

(10) Patent No.: US 6,587,357 B1
(45) Date of Patent: Jul. 1, 2003

(54) METHOD AND APPARATUS FOR PROVIDING INTEGRATED LOW POWER SELF-SUPPLY IN SWITCHED MODE POWER SUPPLIES

(75) Inventors: Josef Halamik, Roznov (CZ); Jefferson W. Hall, Phoenix, AZ (US)

(73) Assignee: Semiconductor Components Industries LLC, Phoenix, AZ (US)

(*) Notice: Subject to any disclaimer, the term of this patent is extended or adjusted under 35 U.S.C. 154(b) by 0 days.

(21) Appl. No.: 09/707,800

(22) Filed: Nov. 8, 2000

(51) Int. Cl.⁷ .............................. H02M 3/335
(52) U.S. Cl. ........................................ 363/20
(58) Field of Search .................. 363/20, 21.01, 363/97, 131

(56) References Cited

U.S. PATENT DOCUMENTS

| | | | |
|---|---|---|---|
| 5,014,178 A | * 5/1991 | Balakrishnan | 363/49 |
| 5,313,381 A | * 5/1994 | Balakrishnan | 363/147 |
| 5,689,407 A | * 11/1997 | Marimus et al. | 363/21 |
| 5,784,231 A | * 7/1998 | Majid et al. | 361/18 |
| 5,933,333 A | 8/1999 | Tsuji | 363/21 |
| 6,016,260 A | * 1/2000 | Heeringa | 363/21 |
| 6,031,747 A | 2/2000 | Ilic et al. | 363/71 |
| 6,038,143 A | 3/2000 | Miyazaki et al. | 363/19 |
| 6,061,253 A | 5/2000 | Igarashi et al. | 363/19 |
| 6,150,798 A | * 11/2000 | Ferry et al. | 323/273 |
| 6,285,569 B1 | * 9/2001 | Hall et al. | 363/21.15 |

* cited by examiner

*Primary Examiner*—Adolf D. Berhane

(57) ABSTRACT

A regulated self-supply power controller for a switched-mode power supply includes an operational voltage supply line having a voltage magnitude that varies between two voltage magnitudes. A controllable power source is intermittently coupled to a capacitor, which is coupled to the operational voltage supply line, on the basis of the variation of the operational voltage supply line voltage magnitude between the two voltage magnitudes.

28 Claims, 3 Drawing Sheets

METHOD AND APPARATUS FOR PROVIDING INTEGRATED LOW POWER SELF-SUPPLY IN SWITCHED MODE POWER SUPPLIES

FIELD OF THE INVENTION

The present invention relates to switched-mode power supplies. More particularly, the present invention relates to a device and method for providing a regulated self-supply power source for switched-mode power supplies.

BACKGROUND OF THE INVENTION

Most modern electronic devices employ switched-mode power supplies due to the high power efficiency and smaller physical size of these types of power supplies. Switched-mode power supplies are also advantageous in that these supplies can provide regulated output voltages having magnitudes higher or lower than the unregulated input supply, and also provide multiple outputs of differing voltage magnitudes.

Switched-mode supply designs are varied, and one of the most common designs is the so-called flyback power supply. One typical flyback power supply includes, in addition to the general circuitry, an auxiliary circuit which is used to supply operational power to the power supply controller circuitry.

There are various weaknesses associated with the use of an auxiliary circuit to supply the controller. First, the auxiliary circuit adds cost and complexity. Second, it adds size to the overall power supply circuit due to the added bulk of the auxiliary winding and its associated components. Third, the auxiliary winding voltage will vary with the supply operating conditions. And last, the auxiliary circuit doesn't provide sufficient operating power if the power supply output is ever overloaded.

Of course, other power supply designs, in addition to the flyback design just described, also employ auxiliary circuits. These other power supply designs suffer the same weaknesses associated with the use of the auxiliary circuit, as the flyback design.

Another flyback power supply design alleviates the need for the auxiliary circuit. This design includes an integrated self-supply circuit for providing operational power to, among other circuitry, the controller circuit. With this design, a power source, such as a constant current source, is selectively connected to charge a capacitor at a predetermined frequency, to a predetermined voltage threshold, and a duty cycle that varies with loading conditions. This operation is controlled by an oscillator operating at a frequency that is typically between 20 kHz and 150 kHz. The oscillator frequency is set such that the capacitor discharges only a few millivolts, typically around 10 to 50 millivolts. This fairly tight line regulation provides for a robust analog circuit design.

Although the above-described design provides a robust design, there are also weaknesses associated with this design. One weakness is that the oscillator frequency is set high enough for undesirable electromagnetic interference (EMI) emissions to occur from the power supply. Also, significant power dissipation occurs with this design because of switching losses, which are proportional to operating frequency. This method also requires additional circuitry to prevent an overvoltage condition due to its fixed, high frequency operation and minimum duty cycle due to delays.

Thus, there is a need in the art for a device that dynamically utilizes power from the primary side of a switched-mode power supply to supply power to the power supply's primary side controller without requiring the need for an auxiliary winding and associated circuitry and the inherent drawbacks discussed above. There is also a need for such a device that does not require such tight line regulation and therefore does not require a high frequency oscillator and high frequency operation of the power management switch, as well as the cost of additional circuitry.

DETAIL DESCRIPTION OF THE DRAWINGS

Figure 1:
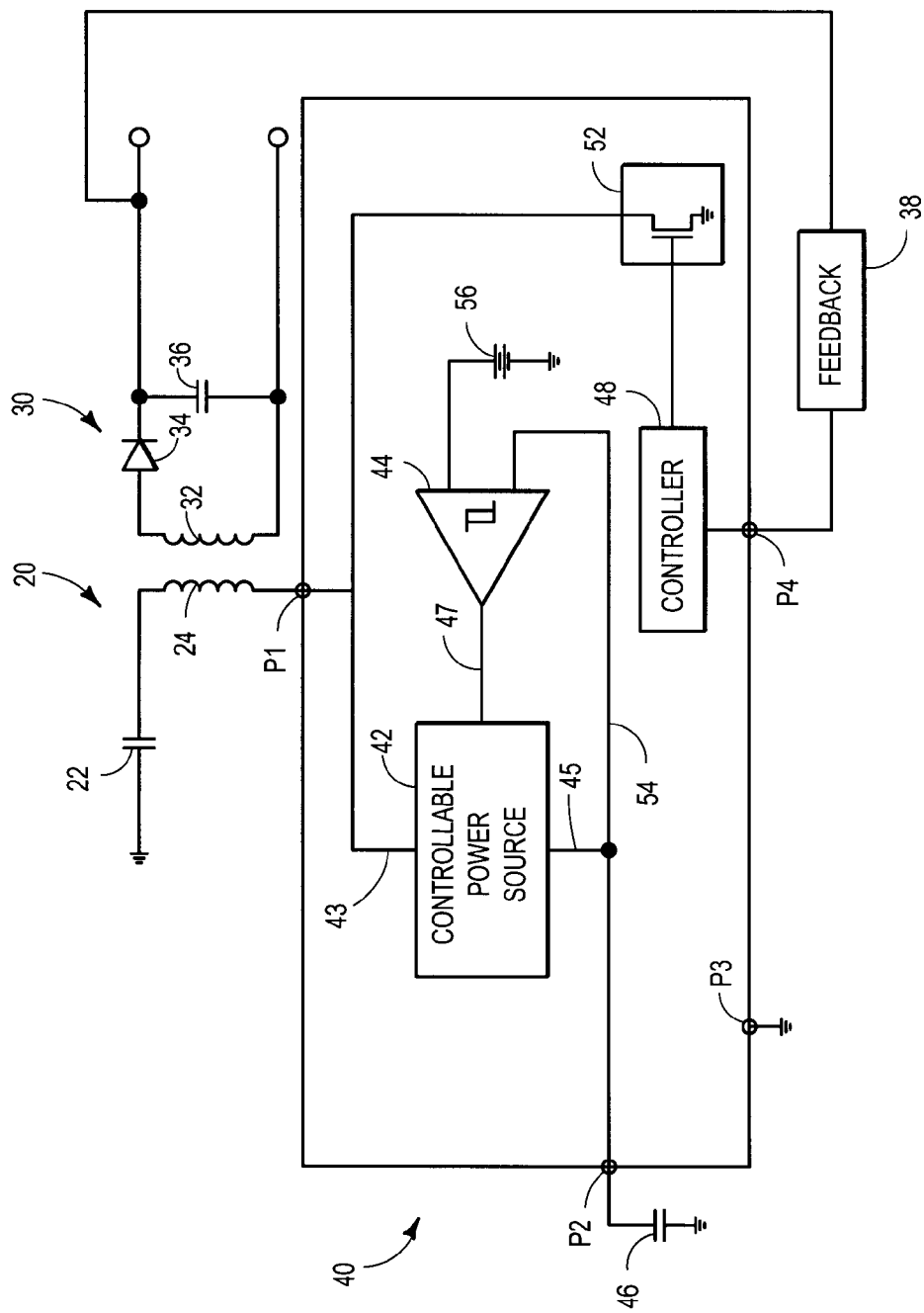
FIG. 1 is a functional schematic diagram of a switched-mode power supply with an integrated self-supply circuit according to the present invention.

A basic functional schematic diagram of a switched-mode power supply 10 according to the present invention is shown in FIG. 1. The power supply 10 includes a primary circuit portion 20, a secondary circuit portion 30, and a self-supply power controller 40.

The primary circuit portion 20 includes a direct current (DC) power source 22 and a primary inductive winding 24. The DC power source 22 is depicted, for simplicity, as being a general DC power source. However, it is typically a full-wave rectifying circuit having an alternating current (AC) input and a filtered DC output. The skilled artisan will appreciate that numerous sources, devices, and methods can be used to implement the depicted DC power source 22. The primary inductive winding 24 is connected at one end to the DC power source 22, and at the other end to the self-supply power controller 40.

The secondary circuit portion 30 includes a secondary inductive winding 32, a rectifier 34, a filter capacitor 36, and a feedback circuit 38. The secondary inductive winding 32 is arranged proximate the primary inductive winding 24 to provide coupling between the windings. The rectifier 34, which is connected to one end of the secondary inductive winding 32, ensures current flows in a single direction from the secondary circuit output. Although depicted as a single diode, the skilled artisan will appreciate that rectifier 34 could be configured as multiple diodes. The filter capacitor 36 smooths the DC voltage waveform at the output of the secondary circuit portion 30. The feedback circuit 38 sends a feedback signal to the self-supply power controller 40. The purpose of the feedback signal will be further discussed below. The feedback circuit 38 is depicted as a block since it could take various forms. For example, the feedback circuit could include an opto-coupler, or any other device that provides electrical isolation between the secondary circuit portion 30 and the self-supply power controller 40.

The self-supply power controller 40 includes a controllable power source 42, a comparator circuit 44, a capacitor 46, a controller 48, a power switch 52, and a reference supply voltage 56. A portion of the self-supply power controller is depicted as being incorporated into an integrated circuit (IC) package having 4 pins, P1–P4. This is only illustrative of one embodiment for carrying out the present invention. The skilled artisan will appreciate that the self-supply power controller 40 could be implemented using individual components, or combinations of components and IC packages. However, it should be appreciated that one of the advantages of the present invention is that, if the self-supply power controller 40 is implemented as shown, the single IC package requires only four external pin connections.

The controllable power source 42 includes in input terminal 43, an output terminal 45, and a control terminal 47. The input terminal 43 is electrically coupled to the primary inductive winding 24, the output terminal 45 is electrically coupled to the capacitor 46, and the control terminal 47 is electrically coupled to an output of the comparator circuit 44. The controllable power source 42 is configured such that it selectively supplies power to the output terminal 45 in response to a signal on the control terminal 47. Thus, since the output terminal 45 is electrically connected to the capacitor 46, the controllable power source 42, in turn, selectively charges the capacitor 46. Moreover, because the capacitor 46 is also connected to an operational voltage supply line 54, the voltage potential on the operational voltage supply line 54 will be the same as the voltage potential across the capacitor 46.

As just noted, the control terminal 47 of the controllable power source 46 is connected to the output of the comparator circuit 44. The comparator circuit 44 further includes an input connected to the operational voltage supply line 54, and another input connected to at least one reference voltage supply 56. The comparator circuit 44, via its output, controls the flow of power from the controllable power source 42 to the capacitor 46.

Specifically, the comparator 44 is configured such that it causes the controllable power source 42 to be electrically connected to, and thus charge, the capacitor 46, whenever the voltage magnitude of the operational voltage supply line 54 is less than or equal to a first voltage magnitude, or is increasing from a magnitude less than or equal to the first voltage magnitude toward a second voltage magnitude. The comparator circuit 44 further causes the controllable power source 42 to be electrically disconnected from the capacitor 46 whenever the voltage magnitude of the operational voltage supply line 54 is greater than or equal to the first voltage magnitude, or is decreasing from a magnitude greater than or equal to the first voltage magnitude toward the second voltage magnitude.

The controller 48 receives the feedback signal from the feedback circuit 38, and controls the switching operation of the power switch 52 on the basis of the feedback signal. Specifically, the controller 48 determines the duty cycle of the power switch 52 that, in turn, controls the periodicity of main current flow through the primary inductive winding 24. The periodicity of the current flow through the primary inductive winding controls the current flow in the secondary inductive winding 32 and thus the output voltage magnitude, as is well-known in the art. The skilled artisan will appreciate that the controller 48 can be implemented in any one of several configurations known in the art; however, the controller 48 is typically a pulse width modulator (PWM) controller.

Figure 2:
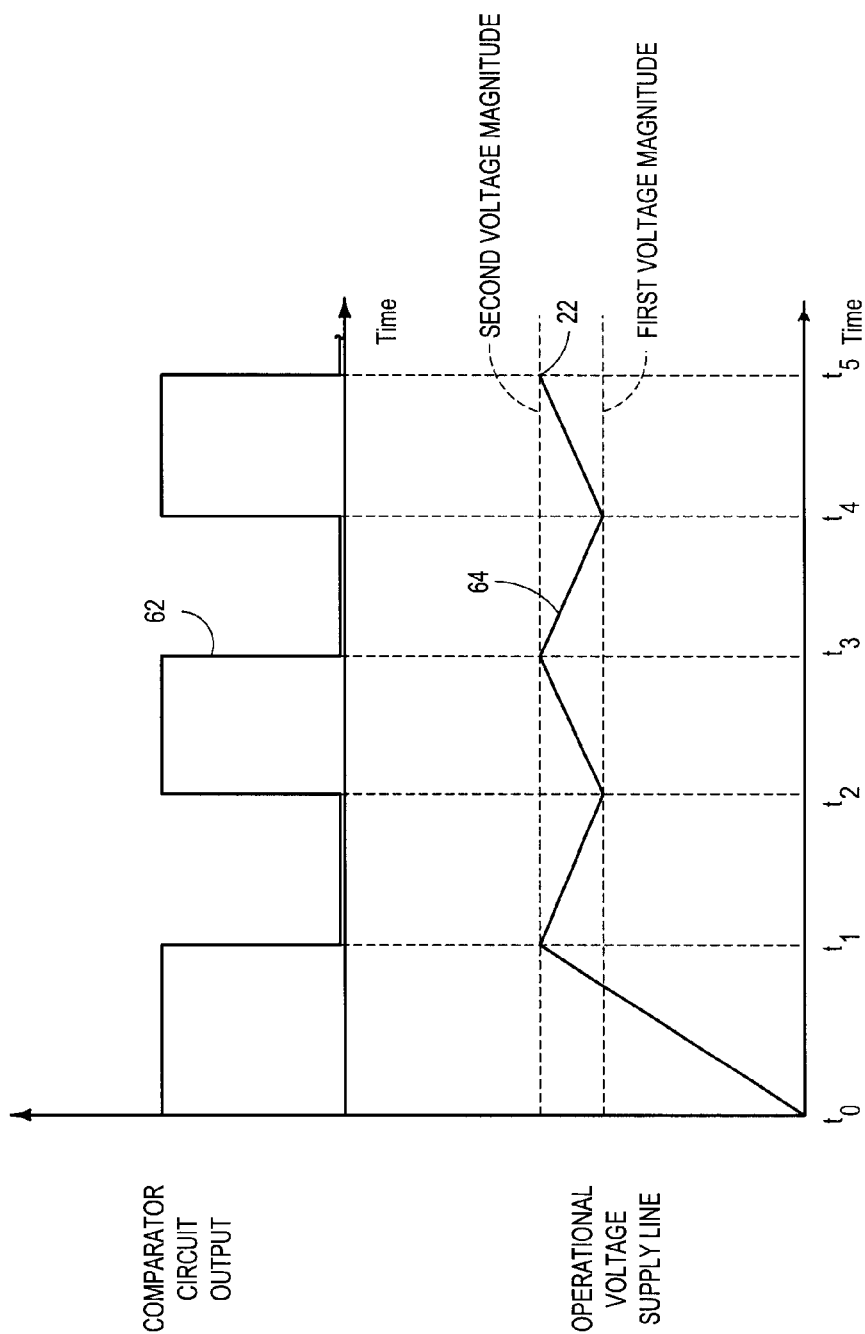
FIG. 2 depicts various waveforms associated with the integrated self-supply circuit depicted in FIG. 1.

Having generally described the power supply circuit 10, an operational description of the self-supply power controller 40 will now be provided. Reference should be made to FIGS. 1 and 2, as necessary.

When the power supply is initially energized, at time to, the capacitor 46 has no stored charge and, therefore, the voltage magnitude of the operational voltage supply line 54 is zero. Thus, the comparator circuit 44 output 47 is high, as indicated by comparator circuit output waveform 62 in FIG. 2, which causes the controllable power source 42 to be electrically connected to the capacitor 46. Thus, the controllable power source 42 supplies current to charge the capacitor 46, which increases the magnitude of the voltage potential on the operational voltage supply line 54. This increase is depicted by the operational voltage supply line magnitude waveform 64 in FIG. 2.

The operational voltage supply line magnitude 64 continues to increase until time $t_1$, when it reaches the second voltage magnitude. At time $t_1$, the comparator output waveform 62 goes low, thus electrically disconnecting the controllable power source 42 from the capacitor 46. Therefore, the operational voltage supply line magnitude 64 decreases due to power that is dissipated by the various circuit components within the self-supply power supply controller 40, which causes the capacitor 46 to discharge.

The variable voltage supply line magnitude 64 continues to decrease until time $t_2$, when it reaches the first voltage magnitude. At time $t_2$, the comparator circuit output waveform 62 goes high once again, thus electrically connecting the controllable power source 42 to the capacitor 46. As a result, the operational voltage supply line magnitude 64 increases, as the capacitor 46 again charges. Then, at time $t_3$, when the voltage supply line magnitude 64 once again reaches the second voltage magnitude, the comparator circuit output waveform 62 goes low, electrically disconnecting the controllable power source from the capacitor 46.

The above-described cycle continuously repeats until power is removed from the input of the primary circuit portion 20. The periodicity of the cycle is controlled by the value of the capacitor 46, the self-supply power controller 40 current, and the power switch 52 frequency and duty cycle. The periodicity of the cycle is influenced by the power switch 52 because the self-supply power controller 40 does not supply power while the power switch is conducting the primary current.

Figure 3:
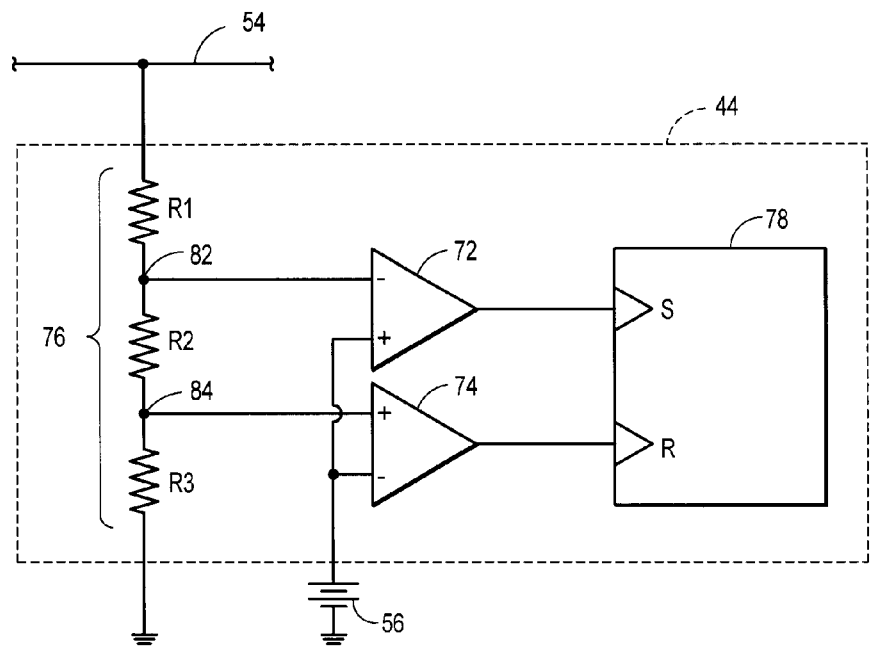
FIG. 3 is a schematic diagram of one example of a comparator circuit usable with the present invention.
Figure 4:
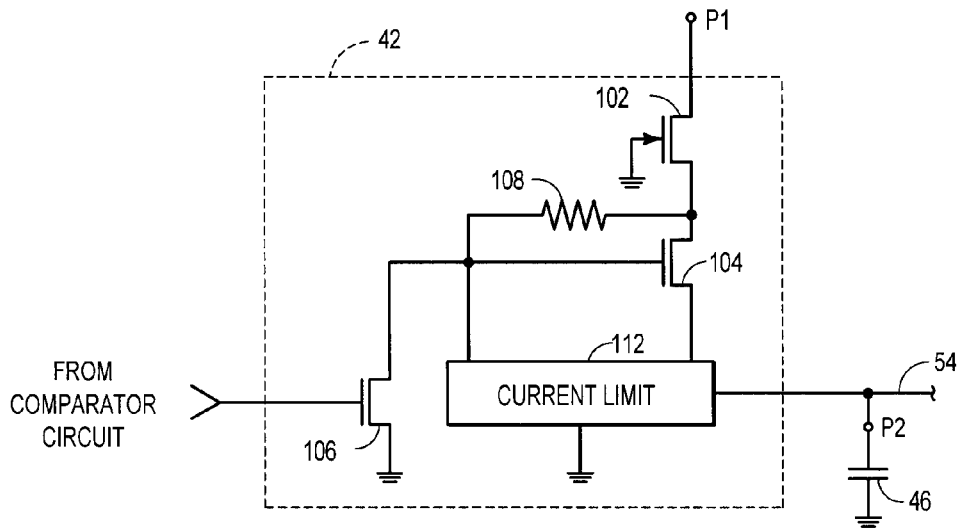
FIG. 4 is a schematic diagram of one example of a controllable power source usable with the present invention.

The controllable power source 42 and the comparator circuit 44 are depicted in FIG. 1 as functional blocks. This is because, as the skilled artisan will fully appreciate, there are numerous and varied ways of implementing these circuits. FIG. 3 depicts one such non-limiting exemplary circuit design for implementing the comparator circuit 44 functionality. Additionally, FIG. 4 depicts a single non-limiting example of a circuit design for implementing the controllable power source 42 functionality. For completeness, each of these circuit designs will now be briefly discussed.

The circuit 70 illustrated in FIG. 3 includes first 72 and second 74 comparators. The first comparator 72 has its inverting input connected to a voltage divider network 76, and its non-inverting input electrically connected to the reference voltage source 56. Conversely, the second comparator 64 has its non-inverting input connected to the voltage divider network 76, and its inverting input connected to the reference voltage source 56. Additionally, the output of each comparator 72, 74 is connected to a logic circuit, which, in the depicted embodiment is a set-reset (S/R) latch 78. Specifically, the output of the first comparator 72 is connected to the SET (S) input of the latch 78, and the output of the second comparator 74 is connected to the RESET (R) input of the latch 78. The skilled artisan will appreciate that other logic circuits could be used to implement the same functionality served by the latch 78.

The voltage divider network 76 is connected between the operational voltage supply line 54 and a reference potential (or ground). The values of the resistors in the voltage divider network 76 (depicted as R1, R2, and R3 for convenience) are chosen so that the output of the first comparator 72 is high when the voltage magnitude at anode 82 is less than or equal to the first voltage magnitude, and the output of the second comparator 74 is high when the voltage magnitude at node a 84 is greater than or equal to the second voltage magnitude.

Thus, when the voltage magnitude of the operational voltage supply line 54 is such that the voltage magnitude at node 82 is less than or equal to the first voltage magnitude, the latch 78 will be set, providing a high output to the controllable power source 42 control terminal 47. As a result, the controllable power source 42 is electrically connected to, and thus charges, the capacitor 46, and the voltage magnitude of the operational voltage supply line 54 increases. When the voltage magnitude of the operational voltage supply line 54 increases to the point where the voltage magnitude at node 84 equals the second voltage magnitude, the latch 78 is reset, providing a low to the controllable power source 42 control terminal 47. Thus, the controllable power source 42 is electrically disconnected from the capacitor 46, and the voltage magnitude of the operational voltage supply line 54 decreases.

Turning now to FIG. 4, an exemplary design for the controllable power source 42 functionality will now be discussed. This exemplary circuit design includes first 102, second 104, and third 106 transistor devices, a biasing resistor 108, and a current limiting circuit 112. Preferably, the first transistor 102 is a junction field effect transistor (JFET), while the second 104 and third 106 transistors are metal-oxide semiconductor FETs (MOSFETs). The first 102 and second 104 transistors are configured, as is known in the art, as a constant current source, by virtue of the current limiting circuit 112. Thus, when third transistor 106 is turned off, by a low output from the comparator circuit 44, a constant current is provided to the capacitor 46 through the current limiting circuit 112. Conversely, when the third transistor 106 is turned on, by a high output from the comparator circuit 44, no current flows to the capacitor 46, and the capacitor 46 begins discharging. The current limiting circuit 112 acts to regulate the voltage on the control terminal of second transistor 104 in order to establish a constant current through second transistor 104.

Again, as previously stated, the depicted and above-described circuit designs for implementing the comparator circuit 44 and the controllable power source 42 functions are merely examples of the numerous and varied circuit designs for implementing these functions. The present invention is in no way intended to be limited to these specific circuit designs.

With the present invention, the operational voltage supply line 54 is not as tightly regulated as in convention self-supply circuits. For example, rather than regulating the operational voltage supply line 54 to within 10 mV, the operational voltage supply line 54 may vary by as much as 1 V or more. This variation is controlled by selecting the appropriate magnitude difference between the first and second voltage magnitudes.

Several advantages are realized from the present invention. First, because the voltage supply line is not tightly regulated, much less power is dissipated by the self-supply power controller 40 overall, since the controllable power source 42 does not supply power to charge the capacitor 46 at high frequencies as with conventional supplies. And second, if the controller 48 is a PWM-type controller, the oscillator within the PWM controller can be implemented as a voltage controlled oscillator (VCO), having the operational voltage supply line 54 as an input. Thus, the oscillator frequency sweeps over a limited range around a central oscillation frequency, which spreads the energy spectrum with respect to frequency and thus reduces the emission of any electromagnetic interference (EMI) emissions therefrom. The VCO sweep rate can be controlled by selecting the appropriate size for the capacitor 46. Thus, as an additional advantage, this implementation requires no additional components to complete the VCO.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. A method of regulating voltage on an operational voltage supply line in a switched-mode power supply self-supply controller, comprising:

selectively routing a primary current to the operational voltage supply line to cycle the operational voltage supply line between a first voltage magnitude and a second voltage magnitude.

2. A method of regulating voltage on an operational voltage supply line in a switched-mode power supply self-supply controller according to claim 1, wherein the first voltage magnitude is less than the second voltage magnitude.

3. A method of regulating voltage on an operational voltage supply line in a switched-mode power supply self-supply controller according to claim 2, further comprising:

coupling the power source to the operational voltage supply line in response to the voltage magnitude of the operational voltage supply line decreasing to a magnitude that is equal to or less than the first voltage magnitude.

4. A method of regulating voltage on an operational voltage supply line in a switched-mode power supply self-supply controller according to claim 2, further comprising:

decoupling the power source from the operational voltage supply line in response to the voltage magnitude of the operational voltage supply line increasing to a magnitude that is equal to or greater than the second voltage magnitude.

5. A method of regulating voltage on an operational voltage supply line in a switched-mode power supply self-supply controller according to claim 1, further comprising:

supplying operational voltage to circuitry within the self-supply controller from the operational voltage supply line.

6. A method of regulating voltage on an operational voltage supply line in a switched-mode power supply self-supply controller according to claim 1, wherein the operational voltage supply line is electrically coupled to an energy storage device.

7. A self-supply power controller for a switched-mode power supply, comprising:

a comparator circuit;

an operational voltage supply line coupled to an input of said comparator circuit; and a controllable power source coupled to an output of said comparator circuit, said controllable power source being controlled by said comparator circuit to be selectively electrically coupled to said operational voltage supply line to cycle the operational voltage supply line between a first voltage magnitude and a second voltage magnitude.

8. A self-supply power controller for a switched-mode power supply according to claim 7, further comprising:
an energy storage device coupled between said operational voltage supply line and a reference potential.

9. A self-supply power controller for a switched-mode power supply according to claim 8, wherein said energy storage device comprises a capacitor.

10. A self-supply power controller for a switched-mode power supply according to claim 7, wherein said controllable power source comprises a constant current source.

11. A self-supply power controller for a switched-mode power supply according to claim 7, wherein the first voltage magnitude is less than the second voltage magnitude.

12. A self-supply power controller for a switched-mode power supply according to claim 11, wherein said comparator circuit causes said controllable power source to be coupled to said operational voltage supply line in response to the voltage magnitude of said operational voltage supply line decreasing to a magnitude that is equal to or less than the first voltage magnitude.

13. A self-supply power controller for a switched-mode power supply according to claim 11, wherein said comparator circuit causes said controllable power source to be decoupled from said operational voltage supply line in response to the voltage magnitude of said operational voltage supply line increasing to a magnitude that is equal to or greater than the first voltage magnitude.

14. A self-supply power controller for a switched-mode power supply according to claim 7, further comprising:
a controller including a feedback input connection; and
a controllable switching device coupled to an output of said controller.

15. A self-supply power controller for a switched-mode power supply according to claim 14, wherein said controller is a pulse width modulator (PWM) controller.

16. A self-supply power controller for a switched-mode power supply according to claim 14, wherein said controllable switching device is a MOSFET.

17. A self-supply power controller for a switched-mode power supply according to claim 14, wherein said operational voltage supply line supplies operational voltage to at least said comparator circuit and said controller.

18. An integrated circuit (IC) for use in regulating a switched-mode power supply, said IC being contained within an IC package including at least a switching pin, a reference potential pin, an operational voltage supply pin, and a feedback pin, said IC comprising:
a controllable power source circuit including an input coupled to said switching pin;
a controller including at least a feedback connection coupled to said feedback pin;
a controllable switching device coupled to an output of, said controller and being controlled by said controller to selectively couple said switching pin to said reference potential pin; and
a comparator circuit including an input coupled to said operational voltage supply pin and an output coupled to a control terminal of said controllable power source circuit, wherein said comparator circuit controls said controllable power source circuit to selectively couple an output of said controllable power source circuit to said operational voltage supply pin to cycle said operational voltage supply pin between a first voltage magnitude and a second voltage magnitude.

19. An integrated power supply controller operating from a supply voltage on a supply line, comprising:
a control circuit having an output for switching a primary current to develop an output voltage at a node; and
a comparator for comparing the supply voltage to a reference voltage for routing the primary current to charge the supply line to a second voltage, wherein the supply line discharges to a first voltage through the integrated power supply controller.

20. The integrated power supply controller of claim 19, further comprising:
a first pin; and
a switch coupled to the first pin for switching the primary current in response to a switching signal produced by the control circuit.

21. The integrated power supply controller of claim 20, wherein the comparator has an output for producing a comparison signal, further comprising a controllable power source operating in response to the comparison signal and coupled to the first pin for routing the primary current to the supply line.

22. The integrated power supply controller of claim 21, wherein the controllable power source includes a current limiter for limiting the magnitude of the primary current through the controllable power source.

23. The integrated power supply controller of claim 22, further comprising a second pin coupled to the supply line for providing a capacitance.

24. The integrated power supply controller of claim 23, further comprising a third pin for coupling a feedback signal from the node to an input of the controller.

25. A method of regulating an output voltage, comprising:
driving a switch with a controller to develop the output voltage at a node;
turning off the switch to charge a supply line from a first voltage magnitude to a second voltage magnitude with the primary current; and
discharging the supply line from the second voltage magnitude to the first voltage magnitude through the controller.

26. The method of claim 25, further comprising coupling a feedback signal to the controller to maintain a magnitude of the output voltage.

27. The method of claim 25, wherein turning off includes:
voltage dividing a supply voltage on the supply line to produce a divided voltage;
comparing the divided voltage to a reference voltage to produce a comparison signal; and
routing the primary current to the supply line with the comparison signal to charge the supply line.

28. The method of claim 27, wherein driving includes conducting a primary current from a first pin through the switch, and routing the primary current to the supply line includes routing the primary current from the first pin through a controllable power source to the supply line.

* * * * *